Aug. 30, 1966 W. C. McGAUGHEY 3,269,172
APPARATUS FOR MEASURING PARTICLES IN LIQUIDS
Filed Feb. Filed Feb. 28, 1963
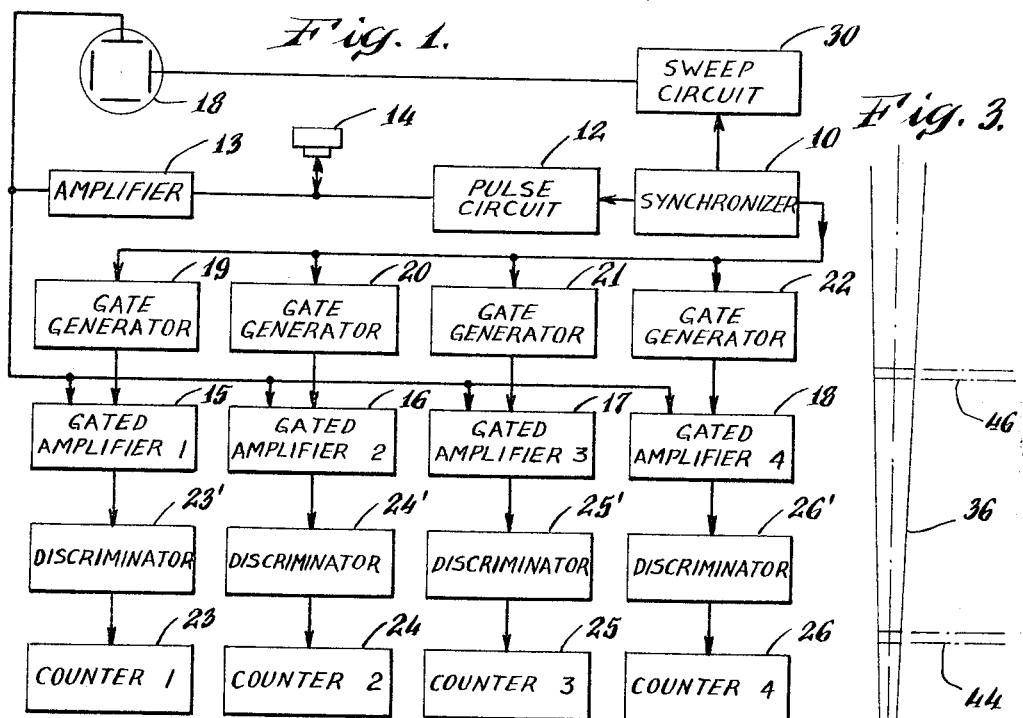
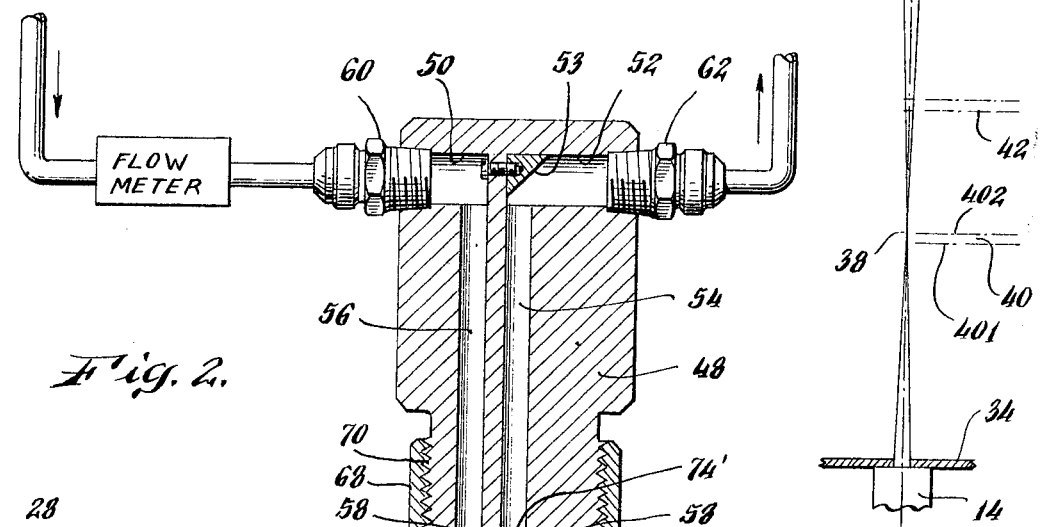
INVENTOR.
William C. McGaughey
BY
Wooster, Davis & Cifelli
ATTORNEYS.

United States Patent Office 3,269,172
Patented August 30, 1966

3,269,172
APPARATUS FOR MEASURING PARTICLES
IN LIQUIDS
William C. McGaughey, New Fairfield, Conn., assignor to Automation Industries, Incorporated, El Segundo, Calif., a corporation of California
Filed Feb. 28, 1963, Ser. No. 261,724
6 Claims. (Cl. 73—61)

This invention relates to apparatus for counting and measuring the particles contained in a fluid medium.

It is highly important in many industries to be able to determine the cleanliness of a liquid by a count of the particles which it contains. The proper operation of hydraulic equipment, for example, may be directly related to the presence or absence of particulate foreign matter in the actuating fluid. Timely inspection and shut-down may also prevent substantial damage to delicate and expensive machinery due to particles contained in the lubricating oils. Further, it is often desired to determine the efficiency of filtering units used with fluid systems, by inspecting the effluent stream to detect the presence of particles.

Many methods have been proposed in the past for making such determinations. The actual filtering of particles from the fluid followed by microscopic counting and sizing, for example, is an accepted method for determining cleanliness of fluids in some applications. It will be readily understood that this method is time-consuming, laborious, expensive, and introduces many possibilities of human error. In order to overcome these problems, various electrical and optical automatic counters have been developed. However, these methods, together with the microscopic counting method, share a common shortcoming in that a considerable time lag occurs between the actual sampling of the fluid and determination of particle inclusion.

It has also been proposed to sample flowing fluids by ultrasonic means to obtain a count of the number and size of included particles. One such method involves the establishment of a stationary inspected volume within a moving fluid stream by means of gating circuits actuating the amplifier of an ultrasonic test instrument such as disclosed in U.S. Patent No. 2,280,226, which issued April 21, 1942, to Floyd A. Firestone. In a system of this type, an ultrasonic transducer is positioned so as to send an ultrasonic pulse into a cell containing the fluid to be tested and to receive "echoes" from contained particles. Electrical pulses of ultrasonic frequency are periodically applied to the transducer and the echo signals are amplified and may be applied to a cathode ray oscilloscope. By means of the gating circuits, only pulses received from a preselected fluid volume are amplified and various counters are actuated in accordance with the amplitude of the signals received. For example, one counter will count only particles within a certain size range. Another counter will react to pulse amplitudes within the next size range, and so forth. The primary disadvantage of such a system is that each counter is sensitive to pulses received from the same volume unit. The size of this gated volume unit must be great enough to include the largest particle that is expected to be encountered but, in the vast majority of contaminated fluid systems, the number of small particles vastly exceeds the number of large particles. It will thus be apparent that in the selected volume a very large number of small sized particles will be present. For this reason, the counters which are sensitive to low amplitude signals indicative of small size particles will be greatly overloaded.

It is, therefore, the primary object of this invention to achieve an improved apparatus for automatically counting and sizing particles in a fluid.

Other objects are to provide such apparatus wherein the various counts are made at a more uniform rate; wherein a flowing fluid may be inspected; and wherein a single transducer may be employed.

The manner in which the above objects are attained will be more fully understood by reference to the following description, the appended claims, and the figures of the attached drawing, wherein:

FIG. 1 is a schematic diagram of an overall circuit embodying this invention;

FIG. 2 is a partially schematic, partially pictorial representation of a test cell in combination with an instrument embodying the circuits of FIG. 1, and FIG. 3 is a diagram illustrating the theory underlying the operation of this invention.

The objects of this invention are attained by passing through a fluid under inspection an ultrasonic beam having a varying cross section. Reflected portions of the beam are received and converted into equivalent electrical signals. Only those signals corresponding to reflections from preselected volumetric zones within the fluid and along the beam are then counted.

By particular reference to FIG. 1, there is illustrated a synchronizer circuit 10 which periodically energizes a pulse-generating circuit 12 to trigger electrical pulses of ultrasonic frequency. The electrical pulses are applied to a piezoelectric transducer 14 which transforms the electrical pulses into mechanical vibrations of ultrasonic frequency. The ultrasonic pulses emanating from transducer 14 are directed into the fluid to be tested. The manner in which this is accomplished will be described in more detail below. The ultrasonic vibrations reflect from particles contained in the fluid and these "echo signals" are retransformed by transducer 14 into electrical signals which are amplified first by main amplifier 13 and then by gated amplifiers 15, 16, 17 and 18. The output of the main amplifier 13 may also be utilized to control the vertical deflection plates of a cathode ray oscilloscope 28. The horizontal plates of the cathode ray oscilloscope are controlled by a sweep circuit 30 which is also activated by synchronizer circuit 10. A suitable power supply provides necessary power voltage to the oscilloscope. The gated amplifiers do not amplify all signal pulses received by them. Rather, each may be considered as being in the normally inactive state, but activated for preselected periods of time by pulses from a corresponding gate generator 19, 20, 21, 22 which, in turn, is controlled by synchronizer circuit 10. Those pulses which are amplified by the gated amplifiers are applied to counters 23, 24, 25 and 26. Each of these counters is provided with an amplitude discriminator 23', 24', 25', 26' arranged so that each counter will be effective to count only pulses exceeding a preselected amplitude.

As has been pointed out above, one of the major deficiencies of prior art ultrasonic counting devices is that a single sample volume is used for inspecting the population of various sized particles. By means of this invention, however, different sized volumes are employed for each range of particle sizes. In this manner, a small volume may be inspected to determine the presence of small particles. This is accomplished by setting the "threshhold" response of each counter at a different level. Thus, one counter will be activated by all pulses received from particles exceeding the minimum selected size. Each succeeding counter is activated only by pulses exceeding a greater amplitude. This result is accomplished by the respective "discriminator" circuits which are well known in the art. The volume of the inspected zone in each instance may be made inversely proportional to the probability of occurrence of the various size particles. Furthermore, all this is accomplished with only one search unit.

As would normally be expected, the population of small particles is usually greater than the population of large particles. For example, in one application it has been discovered that the relationship between the populations within a unit volume of particles greater than 10 microns, greater than 25 microns, greater than 50 microns, and greater than 100 microns, is approximately in the ratio of 1000 to 100 to 10 to 1. For this type of relationship, therefore, a "decade" type gating arrangement should be provided wherein each succeeding inspected volume increases by a factor of 10.

One manner in which this may be accomplished is illustrated in FIGURE 3. This embodiment includes an ultrasonic transducer 14 having a mask 34 and emitting an ultrasonic beam 36. The ultrasonic beam is analogous in many respects to an optical beam. It will be noted that the illustrated beam comes to a focus at a point 38. The beam then expands linearly from this point in a conical configuration. In accordance with this invention, counting is performed at various locations along the axis of the ultrasonic beam by gating each of the gated amplifiers to respond only to pulses received from a selected portion of the beam. For example, zone 40 is formed at essentially the focus of this beam by gating the amplifier 15 to be selective only to pulses received during the time represented by the intervals for passage of ultrasonic echo vibrations from between position 401 and position 402. Zones 42, 44 and 46 are similarly formed at different axial locations along the path of travel of the ultrasonic beam and correspond to the zones "seen" by amplifiers 16, 17 and 18, respectively. The volume of each of the test zones 40, 42, 44 and 46 is determined by the duration of the beam gating interval and the cross sectional area of the beam 36 at the range of the test zone. It may be seen that if the beam 36 is of substantially uniform diameter over its entire length, the volumes of the test zones 40, 42, 44 and 46 may be varied by varying the durations of the gating intervals.

In other words, the beginning and ending of the test zones may be varied by the timing of the opening and closing of the gates 15, 16, 17 and 18. In the present instance the mask 34 is effective to produce a beam 36 having a generally conical configuration with a progressively increasing diameter. As a consequence, the length of each test zone 40, 42, 44 and 46 may be the same, i.e. the gating intervals of the gates 15, 16, 17 and 18 may be the same. However, by varying the ranges to the test zones 40, 42, 44 and 46, a beam diameter may be provided that will produce a test zones of the desired volume.

In the present instance, the volumes of the test zones 40, 42, 44 and 46 are varied in accordance with the probable statistical distribution of the particles between the varying size ranges. By way of example, if the particles in a first size range are normally ten times as numerous as the particles in a second size range, the test zone for the first range may have a volume one tenth as large as the volume of the second test zone.

Under these circumstances it is probable the number of particles of the first size in the first test zone will be equal to the number of particles of the second size in the second zone. As a result of this relationship it is probable the counters 23, 24, 25 and 26 will accumulate approximately the same counts.

In FIG. 2 there is illustrated a test cell assembly designed for use with this invention. The cell comprises a substantially cylindrical body member 48. The upper portion of the cylinder is provided with an inlet passage 50 and an outlet passage 52. The outlet passage 52 communicates with a central bore 54 which extends vertically downward through the center of the cylinder. At the intersection between outlet passage 52 and central bore 54 there is positioned an ultrasonic reflecting surface 53 at an angle to the axis of bore 154. The surface is illustrated as being on a separate block, for ease of manufacture, but may be integral with body member 48. Inlet passage 50 communicates with an off-center bore 56 which communicates with an annular passageway 58 inletted into the lower end of the cylindrical body member 48 and surrounding the opening to the central bore 54. An inlet nipple 60 is threadedly connected into body member 48 to communicate with the outlet passage 52. A search unit housnig 64 is connected to the lower end of body member 48. Housing 64 is substantially cylindrical and has at its upper end a flange 66. An internally threaded collar 68 screws onto matching threads 70 and an internal shoulder 72 keeps the upper surface of the search unit housing 64 in close fitting relationship with the lower end of the body member 48. The lower end of the search unit housing 64 is provided with a central recess 74 for the reception of a sonic search unit. The search unit housing 64 further includes a plurality of slanted passages 76 annularly positioned so that their upper ends communicate with the annular passage 58 while their lower ends communicate with a reduced diameter portion 74' of the central recess 74. An additional central passage 78 extends through the search unit housing 64 and has its upper end coterminous with central bore 54. An ultrasonic search unit assembly 82 of standard design is inserted into recess 74 and held in place by an internally threaded collar 84 which connects to the lower end of the search unit housing 64. Positioned against the crystal end of the search unit assembly 82 is a beam-defining mask 86 which has a central opening for limiting the transverse dimension of the emitted ultrasonic beam. In operation, fluid passes into the cell through inlet nipple 60 and flows downwardly, filling the annular recess 58. From recess 58, the fluid passes through the plurality of slanted passages 76 to the central recess portion 74'. From this recess, adjacent the search unit, the fluid travels upward through passage 78 and bore 54, leaving the cell through outlet passage 52. Ultrasonic pulses from the search unit assembly 82 pass through the fluid in bore 54 and any unreflected pulses are removed from the cell by reflecting surface 53.

An exemplary apparatus embodying the principle of this invention will now be described which utilizes the decade principle referred to above. Inasmuch as the numerical relationship between the numbers of particles exceeding, respectively, 10, 25, 50 and 100 microns to be expected in a unit volume is in the ratio of 1000 to 100 to 10 to 1, the volumes in which these sizes are observed vary in the reverse order. The focus of an ultrasonic beam produces maximum amplitude signals from small particles in a minimum diameter of fluid. Positions beyond the focus produce lower amplitudes at larger diameters. For this reason, the gate generator circuit 19 is arranged to provide a 10 micron gate at the focus, thereby producing the largest possible amplitude from the smallest particles to be expected in the minimum size test zone. Gates for the larger size ranges are set at corresponding positions beyond the focus where the same size particles produce signals that are lower in amplitude. However, as larger particles are being observed in these regions, the problem of dynamic range requirement of the instrument is reduced.

In an exemplary apparatus, the sampling cell comprised a 5-megacycle, ⅜ inch diameter flat plastic faced lithium-sulfate search unit having a mask with a 3/16 inch diameter opening. When used with hydraulic fluid, this configuration resulted in a beam which reached its maximum amplitude and minimum diameter (focus) at about .75 inch from the search unit. This beam was directed into the central bore 54 of the test cell. The gate generators 19–22 were adjusted to provide gates in accordance with the following table:

| Distance of Gate from Search Unit | | Gate Length | | Beam Diameter, in. | Zone Volume, in.³ | Particle Dia., Microns |
|---|---|---|---|---|---|---|
| In. | μsec. | In. | μsec. | | | |
| .75 | 27.6 | .065 | 2.4 | .015 | .00001155 | >10 |
| 1 | 36.8 | .06 | 2.2 | .05 | .0001155 | >25 |
| 2.25 | 82.8 | .065 | 2.4 | 0.15 | .001155 | >50 |
| 5 | 184 | .06 | 2.2 | 0.5 | .01155 | >100 |

Each of the discriminators 23′, 24′, 25′, 26′ was then adjusted so that its corresponding counter would be responsive to and count only signals having amplitudes proportional to particle diameters, respectively, of greater than 10, 25, 50 and 100 microns. Each of the discriminators 23′, 24′, 25′ and 26′ is effective to reject signals below its discrimination level and to pass those signals above its discrimination level. The amplitudes of the signals passed through the gated amplifiers 15, 16, 17 and 18 to the discriminators 23′, 24′, 25′ and 26′ are functions of the range to the test zones and the sizes of the reflecting particles. The amplitude of the signal increases as the size of the reflecting particle increases and decreases as the range increases. It is thus possible to "sort" the particles by a proper choice of discrimination levels.

In the present instance the test zone 40 for the more numerous small particles is at a close range. As a result even the small particles will produce large echo signals. The test zone for the scarcer large particles is at a long range. As a result the large particles will produce signals in the same general range of amplitudes as the closer small particles. It can thus be seen that by a proper choice of test ranges it is possible to separate the large particle signals from the small particle signals even though all of the discrimination levels are equal.

In the operation of this device, counting was done for some preselected interval, such as thirty seconds. Fluid was pumped continuously to the cell, the gated amplifiers responding to amplified signals from the gated zones 40, 42, 44, 46, as indicated in FIG. 3, and each counter responded to all signals which exceeded its preselected discriminated amplitude. Thus, counter 23 was arranged to count signals from particles exceeding 10 microns and recorded signals from all such particles within its zone 40. Similarly, counter 24 counted signals from all particles exceeding 25 microns within zone 42. Counter 25 recorded signals from all particles greater than 50 microns within zone 44, and counter 26 recorded signals from all particles greater than 100 microns within zone 46. From the resultant counter indications, it will be seen to be a relatively simple matter to calculate the distribution and occurence of particles within each of the preselected size ranges.

The actual count registered by each counter is the product of the number of particles to which it responds and the number of ultrasonic pulses which occur as each particle moves through the gated zone. We may define a counting multiple M as:

(1) $$M = \frac{12.88(d)^2(L)(t)(r)}{V}$$

where:
$d$ = cell diameter (inches);
$L$ = gate length (inches);
$t$ = counting time period (secs.);
$r$ = pulse repetition rate (c.p.s.);
$V$ = volume of fluid passing through the cell in time $t$ (ml.).

If $C_1, C_2 \ldots C_n$ represent the recorded count of each counter, then the actual number, P, of particles represented by such a count is:

(2) $$P_n = \frac{C_n}{M}$$

where the subscript "$n$" refers to the counter involved.

Each counter "sees" a different test zone. Furthermore, the diameter of each zone acquires a different value for each range of particle sizes. This is because a 100 micron particle, for example, will provide a signal at a greater distance from the center of the ultrasonic beam than will a 10 micron particle. Accordingly, the counter which is sensitive to 10 micron particles passing through a small diametral portion of the beam will also be sensitive to 25, 50, and 100 micron particles passing through successively greater portions of the beam. Factors must be introduced by which each reading may be multiplied to convert from the numbers of particles in each such *zone* cross section to the number present in the *cell* cross section. Such a factor may be defined as:

(3) $$F_n = \frac{d^2}{d_z^2}$$

where $d_z$ is the zone diameter.

For this example, the "F" factors would be:

$F_{1-00}$, $F_{1-50}$, $F_{1-25}$, $F_{1-10}$ for the 10 micron counter;
$F_{2-100}$, $F_{2-50}$, $F_{2-25}$ for the 25 micron counter;
$F_{3-100}$, $F_{3-50}$, for the 50 micron counter; and
$F_{4-100}$ for the 100 micron counter.

The actual corrected number of particles indicated by each counter will be seen to be:

(4) $$N_n = F_n P_n$$

In this example, $N_{100}$ = the number of particles greater than 100 microns present in the count volume. Each of the four counters indicates this size. The total equals the "F" factor times the counted number:

$$N_{180} = F_{4-100}P_{4-100} = F_{3-100}P_{3-108} = F_{2-188}P_{2-188}$$
$$= F_{1-100} = P_{1-100}$$

Since counter 4 indicates only particles greater than 100 microns:

$$*N_{100} = F_{4-100}\frac{C_4}{M}$$

Similarly, $N_{50}$ = the number of particles greater than 50 microns and less than 100 microns. Counters 1, 2 and 3 indicate this size.

$$N_{50} = F_{3-50}P_{3-50} = F_{2-50}P_{2-50} = F_{1-50}P_{1-50}$$

$$N_{50} = F_{3-50}(P_{3-100})$$

$$*N_{50} = F_{3-50}\left(\frac{C_3}{M} - \frac{N_{100}}{F_{3-100}}\right)$$

$N_{25}$ = the number of particles greater than 25 and less than 50 microns. Counters 1 and 2 indicate this size.

$$N_{25} = F_{2-25}P_{2-25} = F_{1-25}P_{1-25}$$

$$N_{25} = F_{2-25}(P_2 - P_{2-100} - P_{2-50})$$

$$*N_{25} = F_{2-25}\left(\frac{C_2}{M} - \frac{N_{100}}{F_{2-100}} - \frac{N_{50}}{F_{2-50}}\right)$$

$N_{10}$ = the number of particles greater than 10 microns and less than 25 microns. Counter 1 indicates this size.

$$N_{10} = F_{1-10} P_{1-10}$$

$$N_{10} = F_{1-10}(P_{1-100} - P_{1-50} - P_{1-25})$$

$$*N_{10} = F_{1-10}\left(\frac{C_1}{M} - \frac{N_{100}}{F_{1-100}} - \frac{N_{50}}{F_{1-50}} - \frac{N_{25}}{F_{1-25}}\right)$$

It will be seen that this invention comprises a novel approach to the ultrasonic measurement of particles in a fluid stream or fluid body. Although only one search unit and one ultrasonic beam are employed, a plurality of fluid volumes of different sizes may be inspected for the presence or absence of particles within given size ranges. It will be obvious to those skilled in the art that a number of variations and modifications may be made in this invention without departing from the spirit and scope thereof. For example, although a flow type cell has been illustrated, it will be apparent that a *static* cell may be used wherein testing is done on non-flowing fluid. Accordingly, the foregoing description is to be construed as illustrative only, rather than limiting. This invention is liimted only by the scope of the following claims.

What I claim as new and desire to secure by Letters Patent of the United States is:

1. Apparatus for testing a fluid for particle inclusions wherein the particles have sizes in preselected ranges and wherein the particles are normally distributed in predetermined ratios between said size ranges, said apparatus including,
   a flow chamber adapted to allow the fluid to flow therethrough,
   transducer means disposed in said chamber for being acoustically coupled to a fluid therein and transmitting ultrasonic energy into said fluid, said transducer means being effective to receive echoes of ultrasonic energy reflected from particles contained in said fluid and produce separate electrical signals for each particle, said signals occurring at time intervals corresponding to the distance between the transducer means and the particle, pulse generating means coupled to said transducer means for exciting said transducer means into transmitting a beam having a plurality of ultrasonic pulses into the flow chamber,
   at least one gating means coupled to said transducer means and having an open condition for passing signals and a closed condition for blocking signals,
   timing means coupled to the gating means and to the pulse generating means to maintain said gating means in the open condition only during preselected time intervals corresponding to the times for echoes reflected from particles positioned in test zones in said chamber, said gating and timing means being effective to define a separate test zone for each size range, and said transducer means and gating means being effective to establish said test zones along the length of said beam, said test zones having different volumes which are in approximately the same ratios as the number of said particles in said size ranges,
   output means coupled to each of the gating means and responsive to the signal passed through said gating means,
   said output means being adjusted to pass signals of respectively different amplitudes corresponding to echoes from different size particles, said adjustment also being determined in accordance with the amount of attenuation due to the distance of the test zone from the transducer means.

2. Apparatus for testing a fluid for particle inclusions wherein the particles are normally distributed into a plurality of different size ranges, said apparatus including the combination of:
   a test chamber,
   an inlet to said chamber for being interconnected with a source of said fluid for circulating the fluid through said chamber,
   an outlet from said chamber for discharging a fluid that has flowed through the chamber,
   ultrasonic transducer means disposed in the test chamber for being acoustically coupled to the fluid therein for transmitting ultrasonic energy into the fluid as its flows through said chamber, said transducer means being effective to receive echoes of the ultrasonic energy reflected from particles in the fluid,
   pulse means coupled to the transducer means and effective to intermittently energize the transducer means whereby pulses of ultrasonic energy are transmitted into the fluid and echoe pulses are reflected from particles in the fluid and received by the transducer means,
   receiving means coupled to said transducer means and effective to produce electrical pulses corresponding to the received echoes, said electrical pulses being delayed from the transmitted pulse by a time interval corresponding to the distance between the transducer means and the reflecting particle, said pulses having amplitudes corresponding to said distances and to the size of the particles,
   gating means for each size range coupled to said receiving means and each effective to pass only those signals occurring at a predetermined time interval after the transmitted pulse, said transducer and gating means providing a beam of ultrasonic waves in which test zones of different volumes are established along its length, said volumes being in approximately the same ratios as the numbers of particles in the respective size ranges,
   amplitude responsive means effective to pass only those signals having amplitudes corresponding to particles having sizes in the respective size range, and
   output means coupled to said gating means and responsive to the signals passed by said amplitude means.

3. An apparatus for testing a fluid for particle inclusions wherein the particles have sizes in preselected ranges and wherein the particles are normally distributed in predetermined ratios between said ranges, said apparatus including the combination of,
   means for transmitting pulses of ultrasonic energy into said fluid, said means being effective to receive ultrasonic energy reflected from particles contained in said fluid and produce equivalent electrical signals,
   gating means coupled to the first means for alternately blocking and passing said signals,
   said transmitting means and said gating means providing a beam of ultrasonic energy in which test zones of different volumes are established along its length, said volumes being in approximately the same ratios as the numbers of said particles and in said size ranges, and
   separate counting means for each of said test zones, each of said counting means being coupled to the gating means for counting the echoes corresponding to the zones and having amplitudes corresponding to the particles having sizes within the corresponding ranges.

4. Apparatus for testing a fluid containing particles having sizes in preselected ranges, said apparatus including the combination of
   a transducer means for projecting ultrasonic energy into said fluid for reflection from the particles in the fluid, said transducer means being effective to receive the ultrasonic echoes reflected from the particles,
   transmitting means coupled to said transducer means for intermittently energizing the transducer means for transmitting pulses of ultrasonic energy through said fluid for reflection from the particles in said fluid,
   receiving means coupled to said transducer means for providing electrical signals corresponding to the received echoes, said signals occur at times corresponding to the distances between the transducer and the particles and having amplitudes corresponding to said distances and to the sizes of said particles, separate gating means for each of said ranges, each of said gating means being coupled to said receiving means to pass only those signals that occur during gating intervals corresponding to echoes from particles positioned within a corresponding test zone in said fluid and along said beam, and said transducer means and said gating means providing a beam of ultrasonic energy in which said test zones are established along its length, said test zones having differing volumes which are in approximately the same ratios as the numbers of said particles in the corresponding size ranges, counter means coupled to each of said gate means, each of said counter means including amplitude responsive means, each of said counter means being effective to count only those signals corresponding to particles positioned in a particular zone.

5. Apparatus for testing a fluid containing particles wherein the particles have sizes in preselected ranges, and the numbers of particles in said ranges are normally in predetermined ratios, said apparatus including the combination of a transducer for projecting a beam of ultrasonic energy into said fluid for reflection from the particles in the fluid and receiving the ultrasonic echoes reflected from the particles, transmitting means coupled to said transducer for intermittently energizing the transducer for transmitting pulses of ultrasonic energy along said beam and through said fluid, receiving means coupled to said transducer for providing electrical signals corresponding to the received echoes, said signals occur at times corresponding to the distances between the transducer and the particles, separate gating means for each of said ranges coupled to said receiving means, timing means coupled to said transmitting means and said gating means to successively open said gate means during gating intervals, each of said gating intervals corresponding to the time echoes are received from particles positioned within a respective test zone for that size range, said transducer and gating means providing a beam of waves in which test zones of different volumes are established along its length, said volumes being in approximately the same ratios as the numbers of said particles in said size ranges, a separate counter coupled to each of said gate means for each of said zones, said counters being effective to count those signals having amplitudes corresponding to particles having sizes corresponding to the size ranges for the respective test zone.

6. Apparatus for testing a fluid containing particles wherein the particles have sizes in preselected ranges, and the number of particles in said ranges are normally in predetermined ratios, said apparatus including the combination of a transducer for being coupled to the fluid and transmitting energy into said fluid and receiving echoes reflected from the particles, pulse means coupled to said transducer for intermittently energizing the transducer whereby pulses of ultrasonic energy are transmitted through said fluid, said transducer being responsive to echoes and effective to provide electrical signals having amplitudes that are functions of the size of the reflecting particles and that occur at times corresponding to the distances between the transducer and the reflecting particles, separate gating means for each of said ranges, said gating means being coupled to said transducer means and having an open condition for passing said electrical signals and a closed condition for blocking said signals, timing means coupled to said pulse means and each of said gating means to successively open said gate means during gating intervals, each of said gating intervals corresponding to the time echoes are received from particles positioned within respective test zone in said fluid and along said beam, the transducer and gating means providing a beam of waves in which the test zones are established along its length, said test zones having differing volumes which are in approximately the same ratios as the numbers of said particles in said size ranges, amplitude respective means in each of said gating means effective to pass only those signals having amplitudes in excess of a preselected level, and a separate amplitude responsive counter coupled to each of said gate means, said counters being effective to count only those signals passed through its respective gate and having an amplitude in excess of a preselected level.

References Cited by the Examiner
UNITED STATES PATENTS

| | | | |
|---|---|---|---|
| 2,655,893 | 10/1953 | Cox et al. | 73—53 X |
| 2,969,671 | 1/1961 | Sproule | 73—67.9 |
| 2,995,926 | 8/1961 | Dory | 73—67.8 |
| 3,093,998 | 6/1963 | Albertson, et al. | 73—61 |
| 3,103,812 | 9/1963 | Bourne et al. | 73—155 |

RICHARD C. QUEISSER, *Primary Examiner.*

JOHN P. BEAUCHAMP, *Examiner.*